United States Patent

[11] 3,624,424

[72] Inventors Sun Chun Ping
Morristown;
Frank Fuller Judd, Madison; Jan Mark Lieberman, Lake Hiawatha; Helmut Wilhart, Whippany, all of N.J.
[21] Appl. No. 100,150
[22] Filed Dec. 21, 1970
[45] Patented Nov. 30, 1971
[73] Assignee Bell Telephone Laboratories, Inc.
Murray Hill, N.J.

[54] VARIABLE-HYSTERESIS BINARY TRIGGER CIRCUIT
7 Claims, 2 Drawing Figs.

[52] U.S. Cl. .......... 307/290, 307/215, 307/264, 307/291, 328/196, 328/203, 328/206
[51] Int. Cl. .......... H03k 3/295, H03k 19/34, H03k 19/36
[50] Field of Search .......... 307/213, 214, 215, 217, 289, 290, 291, 292, 264, 268, 273, 321; 328/195, 196, 206, 115, 116, 117, 207

[56] References Cited

UNITED STATES PATENTS 3,217,176 11/1965 Chin .......... 307/273 X
3,243,652 3/1966 Meyer et al. .......... 307/215 X
3,284,645 11/1966 Eichelberger et al. .......... 307/289 X
3,316,427 4/1967 Muskovac .......... 307/321 X

OTHER REFERENCES

Francis et al, "Low-cost schmitt trigger made with digital IC", ELECTRONICS (publication), Mar. 4, 1968, pp. 88–89

*Primary Examiner*—Donald D. Forrer
*Assistant Examiner*—L. N. Anagnos
*Attorneys*—R. J. Guenther and E. W. Adams, Jr.

ABSTRACT: A resistance bridge is connected between the analog input terminals and a conventional two-input binary trigger to provide variable hysteresis of the input trigger levels. The analog input is connected across one pair of opposite bridge nodes; a transistor is connected across the other pair of opposite bridge nodes. Intermediate taps on a pair of opposite bridge arms are connected to the respective trigger inputs. Changes in the transistor current, which may be controlled by base drive current, produce corresponding changes in the hysteresis of the trigger levels. Equal resistance and equal tap setting of opposite bridge arms produces symmetrical hysteresis control.

INVENTORS P.S. CHUN
F.F. JUDD
J.M. LIEBERMAN
H. WILHART
BY Joseph Q Cameron
ATTORNEY

VARIABLE-HYSTERESIS BINARY TRIGGER CIRCUIT

BACKGROUND OF THE INVENTION

This invention relates to binary trigger circuits which switch an output between its two possible states in response to predetermined levels of input voltage. More particularly, it relates to a trigger circuit in which the hysteresis between critical input signal levels is dynamically variable.

Binary trigger circuits, such as the Schmitt trigger, are well known and widely used devices for providing a binary output in response to analog input voltage levels. They are used, not only in level detectors and alarm applications, but in logic and control circuits of enormous variety. Such circuits normally display an inherent hysteresis; the input voltage level at which the output switches between its binary states is higher for an increasing input voltage than for a decreasing input voltage. This can be either a severe restriction or a useful feature. Electronics Magazine, Mar. 4, 1968, describes on page 88 an integrated circuit binary trigger whose input triggering levels can be separately adjusted by means of potentiometers. This allows manual adjustment of the hysteresis, increasing the value of the circuit as a level detector. Until now, however, there has been no way to dynamically vary the hysteresis of these trigger circuits.

In an application of common assignee with this application and filed concurrently herewith under names of F, F, Judd - J. M. Lieberman - H. Wilhart Ser. No. 100,148 filed Dec. 21, 1970, a voltage regulator is described that requires a hysteretic binary trigger circuit whose hysteresis can be controlled by a feedback signal.

An object of this invention therefore, is to vary the hysteresis of a binary trigger circuit dynamically in response to a control signal.

Another object is to vary symmetrically in response to a control signal the proportions of input voltage that constitute trip points of a binary trigger.

SUMMARY OF THE INVENTION

Variation of the hysteresis of a binary trigger is provided according to the invention by the use of a resistance bridge between the input voltage terminals and a two-input binary trigger. The input voltage is applied across a pair of opposite nodes of the bridge, and a variable conductance is connected between the remaining two nodes. Intermediate taps on a pair of opposite bridge arms connect to respective trigger inputs. The hysteresis of the circuit is controlled by the conductivity of the variable conductance.

DETAILED DESCRIPTION

Figure 1:
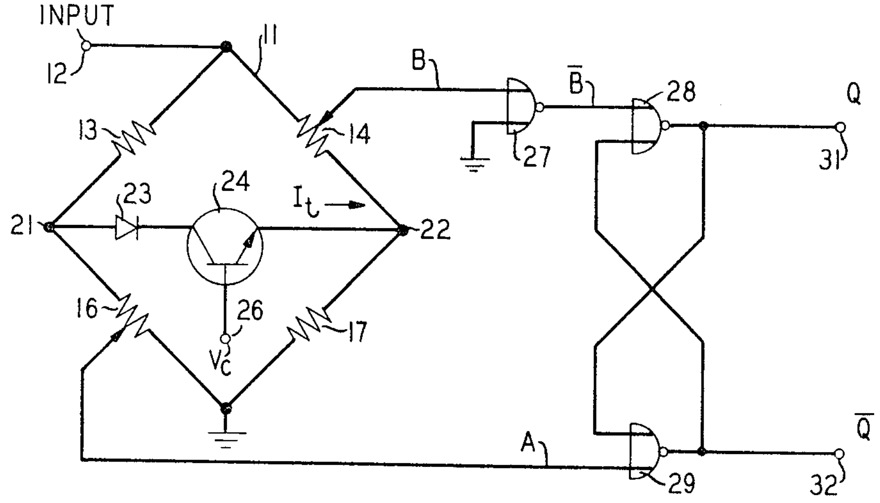
FIG. 1 is a schematic diagram of one very useful embodiment of the invention.

In the variable-hysteresis binary trigger circuit of FIG. 1, a resistance bridge 11 is connected between an input terminal 12 and ground. Connected to input terminal 12 are a resistor 13 and a potentiometer 14. Another potentiometer 16 is connected between resistor 13 and ground, and another resistor 17 is connected between potentiometer 14 and ground. The junction between resistor 13 and potentiometer 16 forms a node 21, and the junction between potentiometer 14 and resistor 17 forms a second node 22. The series combination of the collector-emitter path of a transistor 24 and a diode 23 which is poled to allow flow of collector current is connected between bridge nodes 21 and 22. The base of transistor 24 is connected to a control terminal 26.

The remainder of the binary trigger circuit of FIG. 1 is made up of three, two-input NOR gates 27, 28 and 29. One input of NOR gate 27 is connected to ground; the other input is connected to the tap of potentiometer 14. The output of NOR-gate 27 is connected to one input of NOR-gate 28. The other input of NOR-gate 28 is connected to the output of NOR-gate 29. The output of NOR-gate 28 is connected to one input of NOR-gate 29, and the other input of NOR-gate 29 is connected to the tap of potentiometer 16. Finally, the outputs of NOR-gates 28 and 29 are connected to output terminals 31 and 32, respectively, To understand the operation of the binary trigger circuit, first let us consider the operation of logical NOR-gates 27, 28 and 29. Since one input of NOR-gate 27 is grounded, this gate operates simply as a signal inverter. When its ungrounded input voltage rises high enough to open the gate, that is, when its input becomes a 1 its output switches to a 0. Likewise, when its ungrounded input drops below the gate-opening or trigger level, its output becomes a 1 again. Of course, any other signal inverter, such as a unit gain amplifier, can be used in place of logic gate 27. A NOR gate is used here because of the convenience of producing several gates on a single integrated circuit chip. If we assume the output Q of terminal 31 to be a 0, and that at terminal 32, $\overline{Q}$, to be a 1, as the ungrounded input of gate 27 rises above the trigger level, and its output switches to 0, gate 28 is not switched since there is already a 1 on the input lead from output $\overline{Q}$. As the input A of gate 29 subsequently rises above the trigger level, its output $\overline{Q}$ switches to 0. This, in turn, causes gate 28's output Q to switch to a 1. Since the Q input to gate 29 is a 1, no switching takes place when voltage A falls below the trigger level. Gate 29 is merely prepared to switch when output Q switches to 0. The subsequent dropping of voltage B below the trigger level, causing $\overline{B}$ to rise to 1, operates NOR-gate 28 to switch Q to 0 and $\overline{Q}$ to 1. This sequence of operation continues as long as voltage B is greater than voltage A.

Now consider the operation of bridge circuit 11. For symmetrical control of hysteresis, the resistance values of resistors 13 and 17 may be made equal to each other and less than the resistance value of potentiometers 14 and 16. The voltage at node 21 will then be greater than the voltage at node 22 for all input voltages. In addition, the voltages at the taps of potentiometers 16 and 14, A and B respectively, will vary as constant fractions of the input voltage. With a negative bias on the base of transistor 24 to keep the transistor cut off, potentiometers 14 and 16 may be adjusted to make voltage B only slightly greater than voltage A. Because of the symmetry of the bridge, voltages B and A each become approximately equal to half of the input voltage. As the input voltage varies, B will remain slightly larger than A, as shown by the two plots B and A of FIG. 2. A half sinusoid input voltage $V_{in}$ is assumed for convenience; wave shape is of course immaterial. In addition, identical trigger levels are assumed for gates 27 and 29. With transistor 24 biased beyond cutoff voltage A reaches the gate 29 trigger level after voltage B at point 33. This causes output Q to switch from 0 to 1 as shown by curve 30. Similarly, when output B drops to the gate 27 trigger level after output A, as illustrated by point 34, output Q switches back to 0. This provides the small amount of hysteresis constituting a practical minimum indicated by distance *h* on input waveform $V_{in}$.

To increase the hysteresis of the trigger circuit, bias current is injected into the base of transistor 24 through control terminal 26 to cause transistor 24 through control terminal 26 to cause transistor 24 to conduct. If enough base drive current is used to cause transistor 24 to saturate, the transistor current $I_t$ rises to a maximum. The voltages at nodes 21 and 22 become approximately equal to each other and to one-half the input voltage. Under these conditions, voltage B becomes a larger fraction of input voltage $V_{in}$, and corresponding voltage A a smaller fraction.

Diode 23 is inserted in the transistor collector circuit to prevent transistor base current from returning to ground through potentiometer 16 instead of through resistor 17. Without diode 23, some base current would flow in that improper direction under certain high base current drive conditions to limit the hysteresis range.

Figure 2:
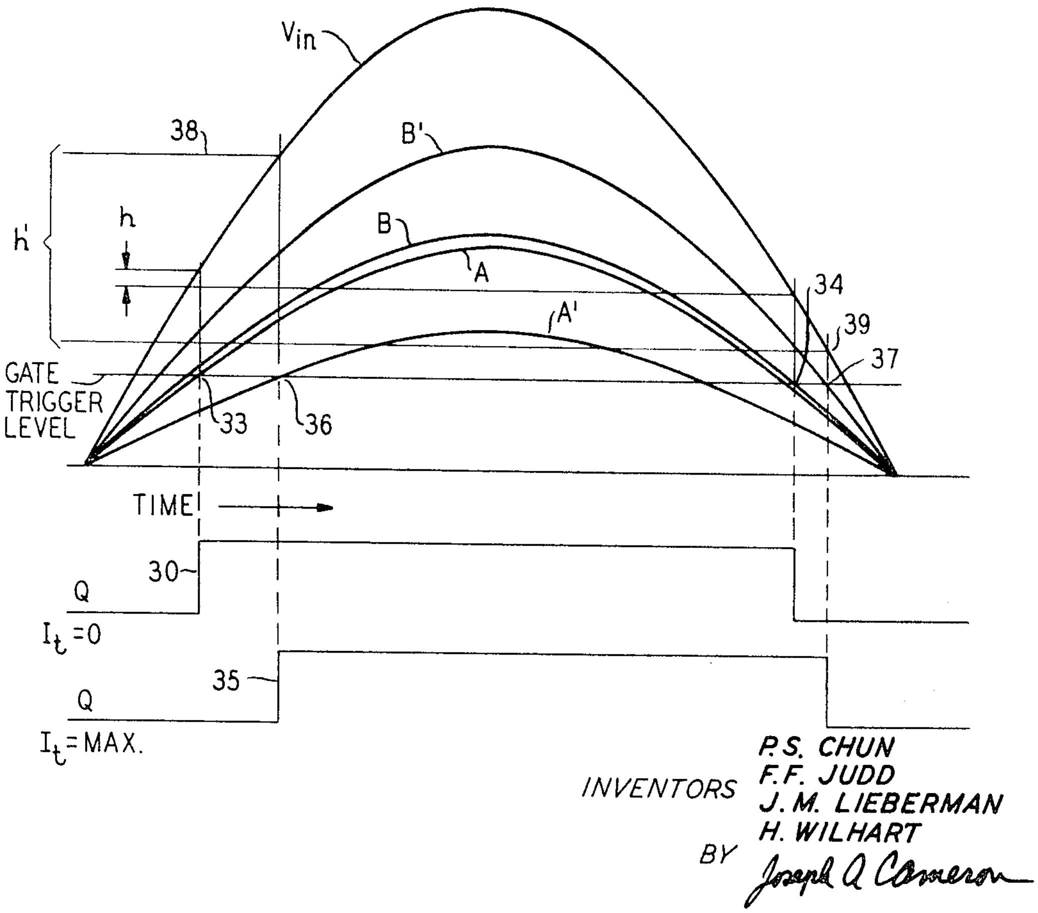
FIG. 2 is a time plot of various circuit voltages that is useful to explain the operation of the circuit of FIG. 1.

In FIG. 2, curve A' and B' represent the values of voltages A and B respectively, with transistor 24 saturated. The evident symmetry between the increase from B to B' and the decrease from A to A' is caused by the arbitrary choice of equal bridge resistor values and potentiometer settings previously discussed. Voltage A' reaches the trigger level at point 36, corresponding to input voltage level 38. This causes output Q to switch to 1, as shown by curve 35. In like manner, voltage B' decreases to trigger level at point 37, corresponding to input voltage level 39, to cause output Q to switch back to 0. The difference between voltage levels 38 and 39 is the resulting hysteresis h'. The base drive to transistor 24 may, of course be varied to provide any intermediate amount of hysteresis instantaneously between the limiting values shown.

While symmetrical variation of the hysteresis is most useful for large control signal variations, the invention is not limited thereto. Asymmetrical changes in hysteresis where they are acceptable or even desired, result from the use of unequal bridge arm resistances or tap settings. For example, if the resistance ratios between resistor 13 and potentiometer 16, and resistor 17 and potentiometer 14 are maintained in order to keep the transistor forward biased, the degree of asymmetry can be controlled by the resistance ratio of resistor 13 to resistor 17. If the value of resistor 17 is larger than that of resistor 13, voltage A will exhibit a smaller change with a given control signal than will voltage B.

The circuit of the invention, therefore, provides a wide range of trigger-level hysteresis that is dynamically variable in response to a control signal voltage. The hysteresis may be varied symmetrically as well as asymmetrically, according to the needs of the application. Because of its simplicity, the circuit is very inexpensive and simple to produce. These features make it very useful for other control applications in addition to the regulated power supply previously mentioned.

This invention is, of course, not limited to the particular embodiment shown. Other arrangements can be used without departing from the spirit and scope of the invention. For example, the binary trigger following the bridge may comprise NAND gates, instead of the NOR gates disclosed, or it may be one of the older trigger circuits containing no logic gates.

What is claimed is:

1. A variable-hysteresis binary trigger circuit comprising a binary trigger having first and second trigger inputs and a binary output; first and second analog-voltage input terminals; and a variable-resistance bridge comprising a first resistance arm and a tapped second resistance arm connected to said first analog-voltage input terminal, a tapped third resistance arm connected between said first resistance arm and said second analog-voltage input terminal, a fourth resistance arm connected between said second resistance arm and said second analog-voltage input terminal and variable conductance means connecting the junction between said first and third resistance arms and the junction between said second and fourth resistance arms, the tap on said second resistance arm being connected to said first trigger input and the tap on said third resistance arm being connected to said second trigger input, whereby the hysteresis of said circuit is controlled by the conductivity of said variable conductance means.

2. A variable-hysteresis trigger circuit as in claim 1 wherein said variable conductance means includes a control input terminal for varying the conductance in response to a control signal applied thereto.

3. A variable-hysteresis trigger circuit as in claim 2 wherein the values of resistance of said first and fourth resistance arms are substantially equal.

4. A variable-hysteresis trigger circuit as in claim 2 wherein said variable conductance means comprises a transistor having its collector-emitter path connected between said bridge arm junctions and its base connected to said control input terminal.

5. A variable-hysteresis trigger circuit as in claim 3 wherein the resistance values of said second and third resistance arms are larger than the resistance values of said first and fourth resistance arms and substantially equal to each other.

6. A variable-hysteresis trigger circuit as in claim 4 wherein said binary trigger comprises a plurality of interconnected logic gates.

7. A variable-hysteresis trigger circuit as in claim 6 wherein said binary trigger comprises a signal inverter and first and second NOR gates, the output of said first NOR gate being connected to a first input of said second NOR gate, the output of said second NOR gate being connected to a first input of said first NOR gate, a second input of said first NOR gate being connected to said second trigger input and a second input of said second NOR gate being connected through said signal inverter to said first trigger input.

* * * * *

UNITED STATES PATENT OFFICE
CERTIFICATE OF CORRECTION

Patent No. 3,624,424 Dated November 30, 1971

Inventor(s) Ping Sun Chun, Frank F. Judd, Jan M. Lieberman and Helmut Wilhart

It is certified that error appears in the above-identified patent and that said Letters Patent are hereby corrected as shown below:

On the front page of the patent under Inventors (No. 72), change the name of the first inventor from "Sun Chun Ping" to --Ping Sun Chun--.

Column 2, line 17, after "a" change "unit" to --unity--.

Column 2, line 62, after "24" delete "through control terminal 26 to",

Column 2, line 63, at the beginning of the line, delete "cause transistor 24".

Signed and sealed this 23rd day of May 1972.

(SEAL)
Attest:

EDWARD M.FLETCHER,JR.
Attesting Officer

ROBERT GOTTSCHALK
Commissioner of Patents